United States Patent [19]

Iantosca

[11] 4,398,333

[45] Aug. 16, 1983

[54] MANIPULATING TOOL

[75] Inventor: Philip D. Iantosca, Spokane, Wash.

[73] Assignee: Instrumentation Laboratory Inc., Lexington, Mass.

[21] Appl. No.: 309,033

[22] Filed: Oct. 6, 1981

[51] Int. Cl.³ .................. B23P 19/02; B23P 19/00; B23Q 7/10; B65D 77/30
[52] U.S. Cl. .................. 29/235; 29/426.5; 29/809; 206/634
[58] Field of Search ............... 206/45.34, 634; 29/235, 29/809, 426.5

[56] References Cited

U.S. PATENT DOCUMENTS

| | | | |
|---|---|---|---|
| 1,556,240 | 10/1925 | Morrissey . | |
| 2,386,416 | 10/1945 | Wilhelm | 206/634 |
| 3,237,294 | 3/1966 | Brandeberry | 29/235 |
| 3,279,044 | 10/1966 | Roper | 29/206 |
| 3,380,141 | 4/1968 | Rofer | 29/203 |
| 3,460,229 | 8/1969 | Crew | 29/203 |
| 3,469,685 | 9/1969 | Baermann | 206/634 |
| 3,871,057 | 3/1975 | Moulin | 29/427 |
| 3,921,804 | 11/1975 | Tester | 206/634 |
| 3,940,840 | 3/1976 | Bellia | 29/235 |
| 4,298,120 | 11/1981 | Kaneko et al. | 206/634 |

OTHER PUBLICATIONS

Catalog entitled "Precision Fluid Measuring and Handling Devices" of Hamilton Company, Copyright 1979, (front cover, pages 1, 12–14 and 55)

Primary Examiner—Ervin M. Combs
Assistant Examiner—Steven E. Nichols

[57] ABSTRACT

A storage and manipulating tool for replacement plunger heads includes a set of storage cavities in which replacement plunger heads (syringe tips) are stored. Each plunger head has an annular flange, and a socket for receiving the end of a cooperating plunger shaft and is stored in its cavity with its socket facing the open end of the storage cavity. The tool also includes elongated passage defining structure for receiving a related plunger shaft. The cross-sectional dimension of the elongated passage is uniform along its length and is less than the annular flange portion of a replacement plunger head stored in a cavity such that axial movement of a plunger shaft in the elongated passage is effective to remove the attached plunger head. The exposed attachment end of the plunger shaft is then inserted into a storage cavity to attach a replacement plunger head for removal from the storage cavity without handling the sealing surfaces of the plunger head.

12 Claims, 8 Drawing Figures

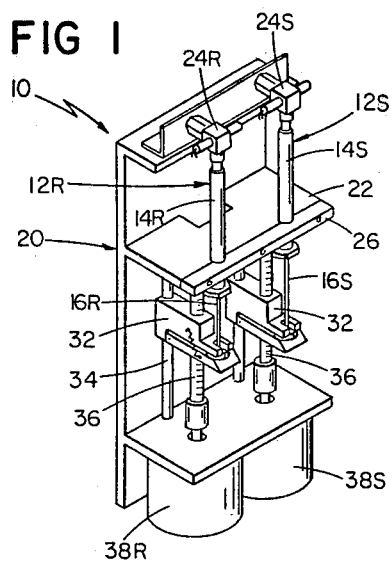
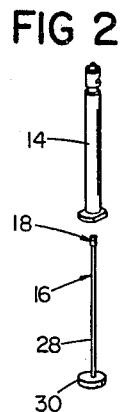
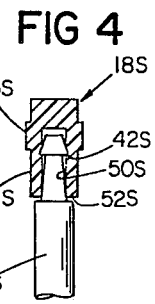
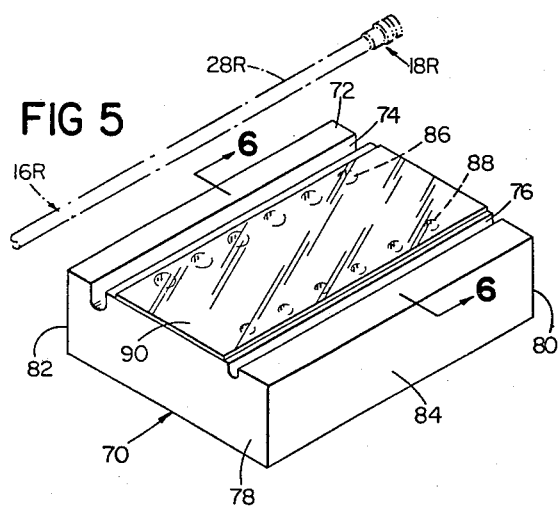
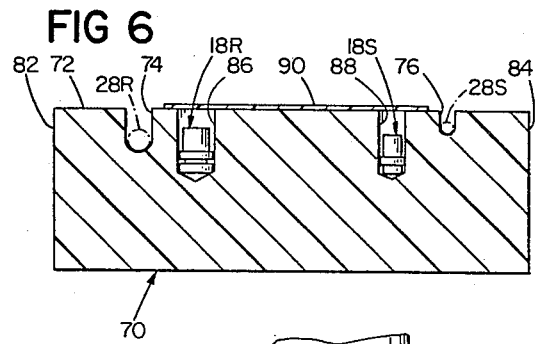
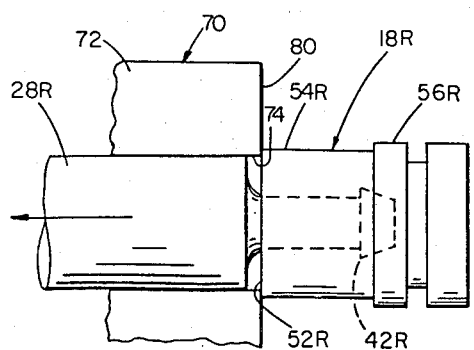
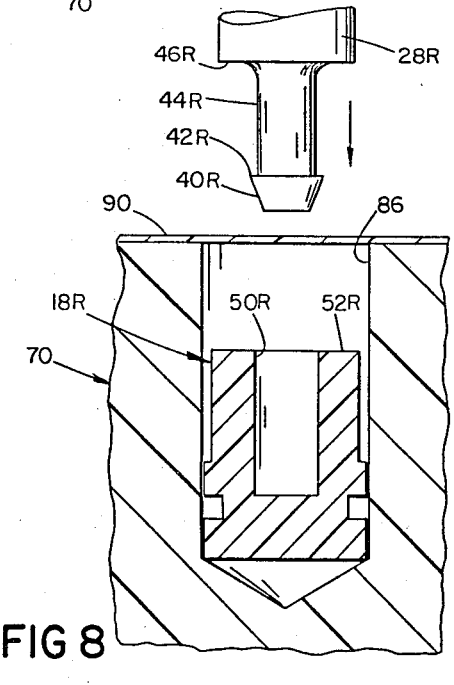

MANIPULATING TOOL

SUMMARY OF THE INVENTION

This invention relates to manipulating tools and more particularly to a manipulating tool for removing and replacing head components of liquid delivery devices of the precision syringe type.

Liquid delivery devices of the precision syringe type find extensive use, in both manual and automated applications, for delivery of precise volumes of liquid. A typical liquid delivery device of this type includes a barrel member and a plunger assembly disposed for reciprocation within the precision bore of the barrel member. The plunger assembly includes a shaft and a replaceable head component that is firmly secured on the end of the shaft and provides an inert, leak tight, sliding seal with the bore surface of the barrel. These plunger heads, which must be periodically removed and replaced in routine maintenance, are difficult to remove and frequently require the use of pliers or hemostats. Care must be exercised both in the head removal and in head reattachment to avoid shaft distortion or head damage while assuring that the replacement tip is attached in proper alignment. Small scratches on or contamination of the sealing surfaces can cause leakage. Such liquid delivery systems employ a range of barrel and plunger head sizes, some heads having a diameter as small as two millimeters and a length in the order of four millimeters, and such small heads involve particular removal and attachment problems.

In accordance with the invention there is provided a storage and manipulating tool for replacement plunger heads includes a set of storage cavities in which replacement plunger heads (syringe tips) are stored. Each plunger head has an annular flange, and a socket for receiving the end of a cooperating plunger shaft and is stored in its cavity with its socket facing the open end of the storage cavity. The tool also includes elongated passage defining structure for receiving a related plunger shaft. The cross-sectional dimension of the elongated passage is uniform along its length and is less than the annular flange portion of a replacement plunger head stored in a cavity such that axial movement of a plunger shaft in the elongated passage is effective to remove the attached plunger head. The exposed attachment end of the plunger shaft is then inserted into a storage cavity to attach a replacement plunger head for removal from the storage cavity without handling the sealing surfaces of the plunger head.

The plunger heads (syringe tips) stored in the manipulating tool may be of the same size or different sizes, depending on the particular application or use of the tool. In a particular embodiment, the syringe tips are retained within their storage cavities by a light transmitting frangible sheet member that maintains the stored tips within a protective environment; and corresponding open top shaft receiving slots are formed in a planar surface of the tool. Gripping surfaces extend along opposite sides of the planar surface and enable the tool to be held in one hand while a plunger shaft held in the operator's other hand is positioned in a slot and slid axially in that slot in action effective to remove an old tip. The exposed attachment end of the plunger shaft is inserted into a storage cavity (optionally puncturing the protective sheet) to attach and withdraw a replacement head. In that particular embodiment, the tool has two parallel shaft receiving slots and two sets of storage cavities, the width of one slot being about two millimeters and the width of the other slot being about 1.3 millimeters, and each storage cavity has a diameter corresponding to the width of a corresponding slot.

In use, a syringe plunger head is removed from a plunger shaft by disposing the plunger shaft in a tool passage and sliding that plunger shaft axially with the plunger head interacting with an end wall of the tool in head stripping action that removes the old plunger head from the shaft. The exposed attachment end of the plunger shaft is then positioned over an appropriate storage cavity and inserted into the socket of the plunger head stored in that cavity in attaching action. The manipulation tool is of a size for convenient manipulation by a technician and facilitates both removal of used plunger heads and properly aligned attachment of replacement plunger heads.

Other features and advantages will be seen as the following description of a particular embodiment progresses, in conjunction with the drawings, in which:

FIG. 1 is a perspective view of an automated dispenser system that uses precision liquid delivery devices of the syringe type;

FIG. 2 is a perspective view of components of a liquid delivery device employed in the dispenser system of FIG. 1;

FIG. 3 is a sectional view (on an enlarged scale) of the end of the reagent dispenser plunger assembly;

FIG. 4 is a sectional view (on an enlarged scale) of the end of the sample dispenser plunger assembly;

FIG. 5 is a perspective view of a manipulating tool in accordance with the invention;

FIG. 6 is a sectional view taken along the line 6—6 of FIG. 5;

FIG. 7 is a diagrammatic view (on an enlarged scale) showing use of the manipulating tool in a plunger head removal operation; and FIG. 8 is a diagrammatic view (on an enlarged scale) showing a plunger head attachment operation.

DESCRIPTION OF PARTICULAR EMBODIMENT

The precision liquid dispensing apparatus 10 shown in the perspective view of FIG. 1 includes a 100 microliter sample syringe 12S (Hamilton model 1710) and a 250 microliter reagent syringe 12R (Hamilton model 1725). Each syringe is a positive displacement liquid metering device and includes a cylindrical glass barrel 14 in which is disposed a plunger assembly 16. Each plunger assembly has a tip member 18 for sealing engagement with the inner surface (bore) of metering barrel 14. The two metering devices are mounted on frame 20 that includes a projecting support plate 22. A flow control unit 24 is disposed at the top of each metering syringe, and clamp bar 26 secures the syringe barrels 14 against support plate 22. Each plunger assembly 16 has a shaft portion 28 and a coupling disc 30 that is connected to a drive assembly 32 mounted for vertical movement along guide rod 34 and driven by lead screw 36 which in turn is driven by a precision stepping motor 38.

Sample metering device 12S includes a precision bore glass tube 14S that has an inner diameter of about $1\frac{3}{8}$ millimeter and an effective capacity of 0.1 milliliter, while reagent metering device 12R has a similar precision bore glass tube 14R that has an inner diameter of about $2\frac{1}{4}$ millimeters and an effective capacity of 0.25 milliliter.

Further details of reagent syringe tip 18R and the associated plunger shaft 28R may be seen with reference to FIG. 3. The end of plunger shaft 28R has a tapered lead surface 40R, an annular gripping tooth 42R and a connecting portion 44R that extends to shaft shoulder 46R. Plunger head 18R is a precision machined member of PTFE (Teflon) that has a socket 50R into which the attachment tooth 42R of shaft 28R bites to firmly secure head 18R on shaft 28R with a small gap between shaft shoulder 46R end surface 52R of the plunger head 18R. The head 18R has a body portion 54R and 2.1 millimeters (0.084 inch) in diameter and two spaced flanges 56R each about 2¼ millimeters (0.090 inch) in diameter and reagent plunger shaft 28R is about two millimeters (0.080 inch) in diameter. The sample plunger, as shown in FIG. 4, has a similar shaft 28S that is about 1¼ millimeter (0.051 inch) in diameter, and the sample plunger head 18S has a body portion 54S about 1.35 millimeters (0.054 inch) in diameter and a flange portion 56S about 1.4 millimeters (0.056 inch) in diameter.

Shown in FIGS. 5 and 6 is a manipulating tool for removing and attaching plunger heads 18 to plunger shafts 28. That tool includes a body structure 70 of plastic (Lexan) or other suitable material and has a length of about 4½ centimeters, a width of about three centimeters, and a height of about 1¼ centimeters. Formed in top surface 72 are two parallel slots 74, 76 that extend the entire length of surface 72 from end wall 78 to opposite end wall 80 parallel to side wall surface 82 and 84. Slot 74 has a rounded bottom; a width of about two millimeters (0.082 inch) and a depth of about 3¼ millimeters (0.130 inch) while slot 76 has a similar rounded base, a width of about 1.3 millimeters (0.052 inch) and a depth of about 2.1 millimeters (0.086 inch). A series of six storage cavities 86, each of which has a diameter of about 2.4 millimeters (0.095 inch) and a depth of about 4½ millimeters (0.18 inch), and a series of six smaller storage cavities 88, each of which has a diameter of about 1.5 millimeters (0.060 inch) and a depth of about 4½ millimeter (0.18 inch) are formed in top surface 72. Disposed in each cavity 86 is a replacement head 18R for reagent metering device 12R and disposed in each cavity 88 is a replacement tip 18S for sample metering device 12S. A transparent, frangible sheet 90 is adhesively secured to top surface 72 between slots 74 and 76 to overlie storage cavities 86 and 88 to provide a secure and clean storage environment for each replacement head 18.

In use of tool 70, after a plunger assembly 16 is removed from its barrel 14, as indicated in FIG. 2, it is placed in its corresponding slot 74, 76. As indicated in FIG. 5, plunger assembly 16R is aligned with slot 74 and inserted into that slot with its head 18R projecting beyond end 80, and its shaft 28R resting on the rounded bottom of slot 74 with closely conforming slot side walls supporting shaft 28R along its length. Movement of shaft 28R axially in slot 74, as indicated in FIG. 7, causes head end surface 52R to engage end surface 80 of tool 70. Continued application of axial force on shaft 28R, as guided and aligned by slot 74, strips the old tip 18R from the shaft. Should end surface 52R slide by surface 80 (as occassionally happens) engagement of flange 56R and end surface 80 provides supplemental tip stripping action. Shaft 28R is removed from slot 74 and its exposed attachment end (lead surface 40R) is positioned as indicated in FIG. 8. Downward movement of the end of shaft 28 punctures protective sheet 90 and the lead surface 40R of attachment tooth 42R enters socket 50R. That lead surface is slid into socket 50R so that there is a space end surface 52 R and shoulder 46R with gripping tooth 42R biting into the wall of socket 50R to firmly attach the replacement head 18R to shaft 28R. Plunger shaft 28R is then lifted upwardly, carrying the firmly attached and properly aligned replacement tip and the plunger assembly is ready for reinsertion into its barrel 14.

An old tip 18S of sample plunger 16S is similarly stripped off through use of slot 76 and a new plunger head 18S stored in cavity 88 is attached in similar manner.

The manipulating tool provides convenient replacement head storage and facilitates removal of old heads from plunger shafts and convenient and accurate attachment of new heads without requiring handling of the minute plunger heads themselves. While a particular embodiment of the invention has been shown and described, various modifications will be apparent to those skilled in the art, and therefore it is not intended that the invention be limited to the disclosed embodiment or to details thereof and departures may be made therefrom within the spirit and scope of the invention.

What is claimed is:

1. A storage and manipulating tool for replacement plunger heads (syringe tips) of the type which include a cylindrical body portion with a socket therein for receiving an attachment end of a cooperating plunger shaft and an annular flange portion of greater diameter than said body portion for sealing engagement with the precision bore of a cylinder of a metering device or the like, said manipulating tool having structure defining a plurality of storage cavities, each said storage cavity having a replacement plunger head disposed therein with the socket of the replacement plunger head adjacent to and facing the open end of its cavity, and elongated passage defining structure integral with said storage cavity defining structure, said elongated passage having a cross-sectional dimension that is uniform along its length and less than said annular flange portion of a replacement plunger head stored in a cavity and greater than said body portion of said stored replacement plunger head such that axial movement of a plunger shaft with an attached plunger head disposed in said elongated passage is effective to remove the attached plunger head from said plunger shaft and insertion of the exposed attachment end of the plunger shaft into a storage cavity is effective to attach a replacement plunger head to said plunger shaft for removal from said storage cavity without handling of the flange portion of the replacement plunger head attached to said plunger shaft.

2. The tool of claim 1 and further including a frangible sheet member overlying each storage cavity for retaining said replacement plunger head therein.

3. The tool of claim 2 wherein said sheet member is light transmitting so that contents of said storage cavity may be seen therethrough.

4. The tool of claim 2 wherein said sheet member is adhesively attached to a surface of said manipulating tool.

5. The tool of claim 1 wherein said elongated passage is an open top slot that is open at both ends.

6. The tool of claim 5 wherein said slot has a rounded base on which the plunger shaft is seated when the shaft is disposed in said slot.

7. The tool of claim 6 wherein said slot has a width of less than about two millimeters.

8. The tool of claim 5 wherein there are two parallel slots and two sets of storage cavities in said tool, each set of storage cavities having diameters corresponding to the width of a corresponding slot, and the width of one slot being greater than the width of the other slot.

9. The tool of claim 8 wherein said tool is a unitary member that has a planar surface in which said slots and said cavities are formed and gripping surfaces that extend along opposite sides of said planar surface so that said tool may be held in one hand of an operator while a plunger head is being removed from and a replacement plunger head is being attached to a plunger shaft held in the operator's other hand.

10. The tool of claim 9 wherein the width of said other slot is less than two millimeters.

11. The tool of claim 9 and further including a frangible sheet member adhesively attached to said planar surface of said manipulating tool and overlying said storage cavities for retaining said replacement plunger heads therein.

12. The tool of claim 11 wherein the width of said one slot is about two millimeters and the width of said other slot is about 1.3 millimeters.

* * * * *